(12) United States Patent
Kato

(10) Patent No.: US 12,020,870 B2
(45) Date of Patent: *Jun. 25, 2024

(54) MULTI-LAYER CERAMIC CAPACITOR AND METHOD OF PRODUCING THE SAME PRELIMINARY CLASS

(71) Applicant: Taiyo Yuden Co., Ltd., Tokyo (JP)

(72) Inventor: Yoichi Kato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,185

(22) Filed: Dec. 28, 2022

(65) Prior Publication Data

US 2023/0162924 A1 May 25, 2023

Related U.S. Application Data

(63) Continuation of application No. 17/647,566, filed on Jan. 10, 2022, now Pat. No. 11,569,040, which is a
(Continued)

(30) Foreign Application Priority Data

May 9, 2018 (JP) ................................ 2018-090320

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1227* (2013.01);
(Continued)

(58) Field of Classification Search
CPC ........ H01G 4/30; H01G 4/012; H01G 4/1227; H01G 4/1236; H01G 4/1235; H01G 4/232; H01G 4/248; H01G 4/1245
(Continued)

(56) References Cited

U.S. PATENT DOCUMENTS 6,839,221 B2   1/2005  Sugimoto et al.
9,368,281 B2 * 6/2016  Morita ..................... H01G 4/30
(Continued)

FOREIGN PATENT DOCUMENTS

JP   2016-1721 A    1/2016
JP   2017-28013 A   2/2017

OTHER PUBLICATIONS

Office Action dated Dec. 23, 2020 in U.S. Appl. No. 16/395,618.
(Continued)

*Primary Examiner* — Arun Ramaswamy
(74) *Attorney, Agent, or Firm* — Saliwanchik, Lloyd & Eisenschenk

(57) ABSTRACT

A multi-layer ceramic capacitor includes a first region, a second region, a multi-layer unit, and a side margin. In the first region, crystal grains including intragranular pores are dispersed. In the second region, crystal grains including intragranular pores are not dispersed. The multi-layer unit includes ceramic layers that are laminated in a first direction and include the second region, and internal electrodes disposed between the ceramic layers. The side margin covers the multi-layer unit from a second direction orthogonal to the first direction and includes a region, the region being adjacent to the multi-layer unit and including the first region.

6 Claims, 10 Drawing Sheets

Related U.S. Application Data continuation of application No. 16/395,618, filed on Apr. 26, 2019, now Pat. No. 11,257,624.

(51) Int. Cl.
  *H01G 4/12* (2006.01)
  *H01G 4/232* (2006.01)
  *H01G 4/248* (2006.01)

(52) U.S. Cl.
  CPC ......... *H01G 4/1236* (2013.01); *H01G 4/1245* (2013.01); *H01G 4/232* (2013.01); *H01G 4/248* (2013.01)

(58) Field of Classification Search
  USPC ............. 361/301.4, 311, 321.1, 321.2, 321.5
  See application file for complete search history.

(56) References Cited

U.S. PATENT DOCUMENTS

| | | | |
|---|---|---|---|
| 9,812,259 | B2 | 11/2017 | Lee et al. |
| 10,373,762 | B2* | 8/2019 | Hong ................. H01G 4/30 |
| 2008/0266751 | A1 | 10/2008 | Yamazaki et al. |
| 2011/0141655 | A1 | 6/2011 | Jeong et al. |
| 2011/0141660 | A1 | 6/2011 | Jeong et al. |
| 2013/0114182 | A1 | 5/2013 | Suh et al. |
| 2014/0043722 | A1 | 2/2014 | Hirata et al. |
| 2014/0301015 | A1* | 10/2014 | Kim ................. H01G 4/12 29/25.03 |
| 2017/0018363 | A1* | 1/2017 | Tanaka ................. H01G 4/232 |
| 2017/0133157 | A1 | 5/2017 | Fukunaga et al. |
| 2017/0243697 | A1* | 8/2017 | Mizuno ............... H01G 4/1227 |
| 2020/0258689 | A1 | 8/2020 | Kato |

OTHER PUBLICATIONS

Office Action dated Jul. 14, 2021 in U.S. Appl. No. 16/395,618.
Notice of Allowance dated Oct. 8, 2021 in U.S. Appl. No. 16/395,618.
Notice of Allowance dated Oct. 4, 2022 in U.S. Appl. No. 17/647,566.

* cited by examiner

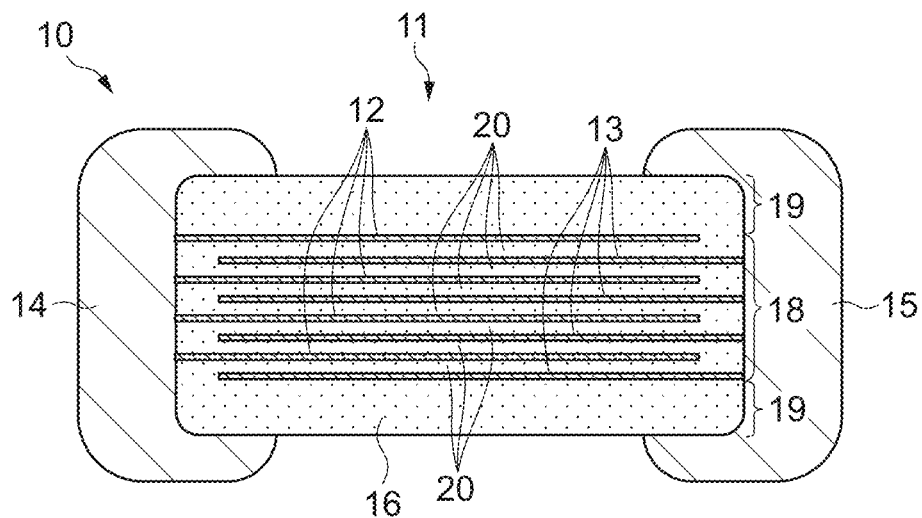
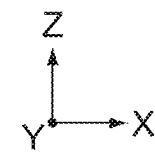
FIG.2
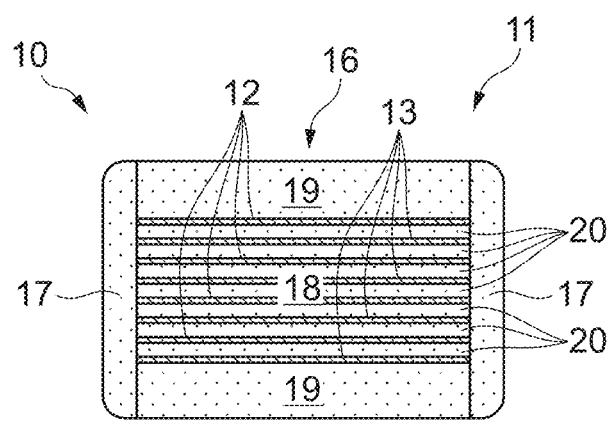
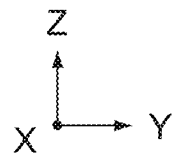
FIG.3

MULTI-LAYER CERAMIC CAPACITOR AND METHOD OF PRODUCING THE SAME PRELIMINARY CLASS

CROSS-REFERENCE TO RELATED APPLICATIONS

This application is a continuation of U.S. application Ser. No. 17/647,566, filed Jan. 10, 2022; which is a continuation of U.S. application Ser. No. 16/395,618, filed Apr. 26, 2019, now U.S. Pat. No. 11,257,624, issued Feb. 22, 2022; which claims the benefit of Japanese Application No. 2018-090320, filed May 9, 2018; which is hereby incorporated by reference in its entirety.

BACKGROUND

The present disclosure relates to a multi-layer ceramic capacitor including side margins provided in a later step, and to a method of producing the multi-layer ceramic capacitor.

Japanese Patent Application Laid-open Nos. 2016-001721 and 2017-028013 each disclose a technique of providing side margins in a later step in a method of producing a multi-layer ceramic capacitor, the side margins protecting the periphery of internal electrodes. In this technique, a multi-layer unit including internal electrodes, which are exposed on side surfaces of the multi-layer unit, is produced, and side margins are provided to the side surfaces, thus providing a ceramic body.

However, in the technique of providing side margins in a later step, it is difficult to ensure reliability of moisture resistance or the like. Thus, the technique disclosed in each of Japanese Patent Application Laid-open Nos. 2016-001721 and 2017-028013 achieves improvement in sinterability of the side margins by adding silicon, as a sintering additive, to the side margins. Accordingly, the reliability of the multi-layer ceramic capacitor is improved.

SUMMARY

However, in the technique of adding silicon to the side margins, silicon contained in the side margins is dispersed in the multi-layer unit at the time of sintering, and an electrostatic capacitance of the multi-layer ceramic capacitor is likely to be lowered. Thus, this technique makes it difficult to provide a multi-layer ceramic capacitor having a large electrostatic capacitance.

In view of the circumstances as described above, it is desirable to provide a multi-layer ceramic capacitor and a method of producing the multi-layer ceramic capacitor, which are capable of satisfying both of a large electrostatic capacitance and high reliability.

According to an embodiment of the present disclosure, there is provided a multi-layer ceramic capacitor including a first region, a second region, a multi-layer unit, and a side margin.

In the first region, crystal grains including intragranular pores are dispersed.

In the second region, crystal grains including intragranular pores are not dispersed.

The multi-layer unit includes ceramic layers that are laminated in a first direction and include the second region, and internal electrodes disposed between the ceramic layers.

The side margin covers the multi-layer unit from a second direction orthogonal to the first direction and includes a region, the region being adjacent to the multi-layer unit and including the first region.

In the multi-layer ceramic capacitor, the first region is formed of a hydrothermal powder produced by a hydrothermal method. The hydrothermal powder is a fine ceramic powder that can be produced at low cost and is formed of particles having a uniform particle size. In the first region formed of the hydrothermal powder, a characteristic microstructure in which crystal grains including intragranular pores are dispersed is found. In the first region, a large dielectric constant is difficult to obtain due to the existence of the intragranular pores.

In the present disclosure, in the side margin that does not contribute to the electrostatic capacitance, a region adjacent to at least the multi-layer unit is formed as the first region. Accordingly, an unsintered side margin including as a main component the hydrothermal powder, which is a fine powder formed of particles having a uniform particle size, comes into close contact with the side surface of the multi-layer unit along the side surface without gaps, and thus a multi-layer ceramic capacitor having high reliability is obtained.

Meanwhile, unlike the first region, the second region is free from the hydrothermal powder. The second region is formed of a ceramic powder produced by a method different from the hydrothermal method, for example, a method of obtaining a sufficiently large dielectric constant, such as a solid-phase method. Thus, in the second region, there is no microstructure in which crystal grains including intragranular pores are dispersed, and a large dielectric constant can be obtained.

In the present disclosure, the ceramic layers are formed as the second region. Accordingly, in the multi-layer ceramic capacitor, a large electrostatic capacitance can be obtained. In such a manner, in the multi-layer ceramic capacitor, the side margin and the ceramic layer are formed of different ceramic powders, so that both of a large electrostatic capacitance and high reliability can be satisfied.

The side margin may include the first region over the entire side margin.

In this configuration, in the side margin formed of the hydrothermal powder, high sinterability is obtained over the entire side margin. Accordingly, the reliability of the multi-layer ceramic capacitor is further improved.

The side margin may include an external layer including the second region, and a connection layer that is disposed between the external layer and the multi-layer unit and includes the first region.

In this configuration, the multi-layer unit and the external layer are suitably bonded to each other via an unsintered connection layer formed of the hydrothermal powder.

The first region may include silicon of 0.5 mol % or less.

In the multi-layer ceramic capacitor, reduction in electrostatic capacitance due to the dispersion of silicon from the side margin to the multi-layer unit is less likely to be caused.

The side margin may have a grain boundary pore rate of 5% or less.

In this configuration, the reliability of the multi-layer ceramic capacitor is further improved.

Each of the first region and the second region may include polycrystal having a Perovskite structure including barium and titanium.

According to another embodiment of the present disclosure, there is provided a method of producing a multi-layer ceramic capacitor, the method including: preparing a first powder including, as a main component, ceramic particles having a Perovskite structure having an axis ratio c/a of 1.008 or less and including intragranular pores; preparing a second powder including, as a main component, ceramic particles free from intragranular pores; producing an unsintered multi-layer unit that includes ceramic layers laminated in a first direction and including the second powder as a main component, and internal electrodes disposed between the ceramic layers; producing a ceramic body by forming a side margin including the first powder as a main component on a side surface of the multi-layer unit, the side surface facing in a second direction orthogonal to the first direction; and sintering the ceramic body.

The side margin may be formed by attaching a ceramic sheet including the first powder as a main component to the side surface.

The ceramic sheet may be free from silicon.

Further, according to another embodiment of the present disclosure, there is provided a method of producing a multi-layer ceramic capacitor, the method including: preparing a first powder including, as a main component, ceramic particles having a Perovskite structure having an axis ratio c/a of 1.008 or less and including intragranular pores; preparing a second powder including, as a main component, ceramic particles free from intragranular pores; producing an unsintered multi-layer unit that includes ceramic layers laminated in a first direction and including the second powder as a main component, and internal electrodes disposed between the ceramic layers; producing a ceramic body by attaching a ceramic sheet to a side surface of the multi-layer unit via a connection layer including the first powder as a main component, the side surface facing in a second direction orthogonal to the first direction; and sintering the ceramic body.

The connection layer may be free from silicon.

In those methods, the first powder is produced by the hydrothermal method. This allows the multi-layer ceramic capacitor to be produced. In particular, the first powder that is the hydrothermal powder has a low axis ratio c/a, that is, low crystallinity. Thus, in the side margin formed of the first powder, high sinterability is obtained. Accordingly, the reliability of the multi-layer ceramic capacitor is further improved.

The first powder may have a mean particle size of 5 nm or more and 500 nm or less.

The second powder may be produced by a solid-phase method.

As described above, according to the present disclosure, it is possible to provide a multi-layer ceramic capacitor and a method of producing the multi-layer ceramic capacitor, which are capable of satisfying both of a large electrostatic capacitance and high reliability.

These and other objects, features and advantages of the present invention will become more apparent in light of the following detailed description of embodiments thereof, as illustrated in the accompanying drawings.

BRIEF DESCRIPTION OF DRAWINGS

FIG. 2 is a cross-sectional view of the multi-layer ceramic capacitor taken along the A-A' line in FIG. 1;

FIG. 3 is a cross-sectional view of the multi-layer ceramic capacitor taken along the B-B' line in FIG. 1;

DETAILED DESCRIPTION OF EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

I First Embodiment

1. Overall Configuration of Multi-layer Ceramic Capacitor 10

Figure 1:
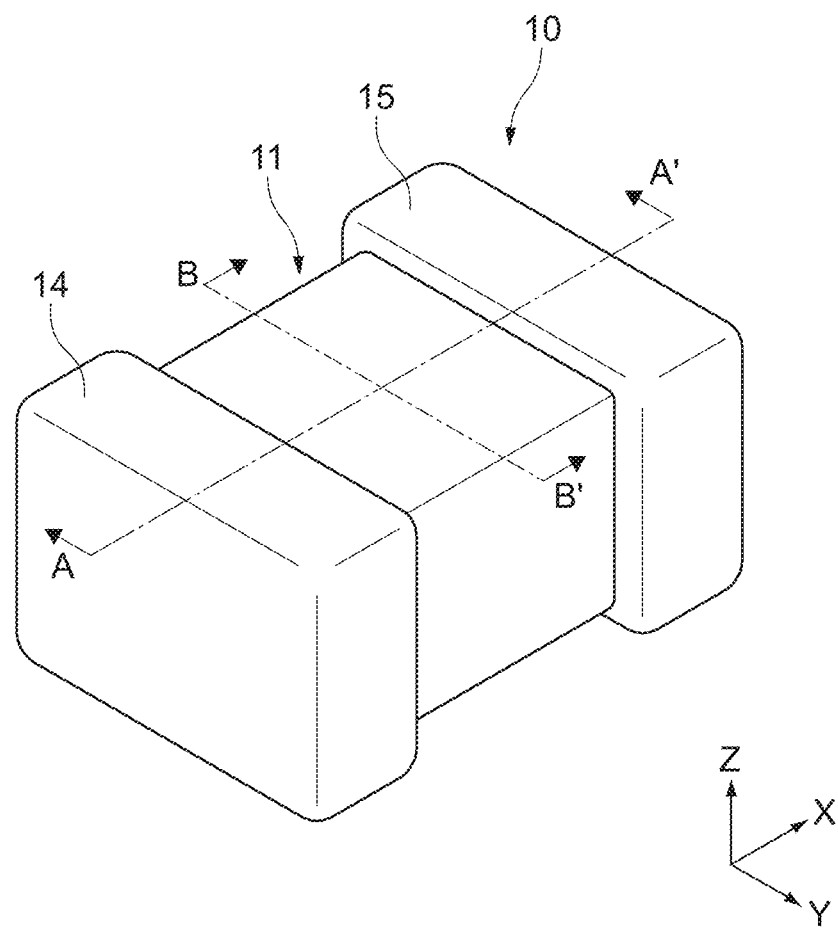
FIG. 1 is a perspective view of a multi-layer ceramic capacitor according to a first embodiment of the present disclosure.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two end surfaces facing in the X-axis direction, two side surfaces facing in the Y-axis direction, and two main surfaces facing in the Z-axis direction. Ridges connecting the respective surfaces of the ceramic body 11 are chamfered.

It should be noted that the shape of the ceramic body 11 is not limited to the shape as described above. In other words, the ceramic body 11 does not need to have a rectangular parallelepiped shape as shown in FIGS. 1 to 3. For example, the surfaces of the ceramic body 11 may be curved surfaces, and the ceramic body 11 may be rounded as a whole.

The first external electrode 14 and the second external electrode 15 cover both the end surfaces of the ceramic body 11 that face in the X-axis direction, and extend to four surfaces (two main surfaces and two side surfaces) that are connected to both the end surfaces facing in the X-axis direction. With this configuration, both of the first external electrode 14 and the second external electrode 15 have U-shaped cross sections parallel to the X-Z plane and the X-Y plane.

The ceramic body 11 includes a multi-layer unit 16 and side margins 17. The side margins 17 cover the entire areas of both the side surfaces of the multi-layer unit 16 that face in the Y-axis direction. The multi-layer unit 16 includes a capacitance forming unit 18 and covers 19. The covers 19 cover the upper and lower surfaces of the capacitance forming unit 18 in the Z-axis direction.

The capacitance forming unit 18 includes a plurality of ceramic layers 20, a plurality of first internal electrodes 12, and a plurality of second internal electrodes 13. The plurality of ceramic layers 20 are flat plate-like ceramic layers extending parallel to the X-Y plane and laminated in the Z-axis direction. The covers 19 do not include the first and second internal electrodes 12 and 13.

The first and second internal electrodes 12 and 13 are alternately disposed in the Z-axis direction between the plurality of ceramic layers 20. The first internal electrodes 12 are connected to the first external electrode 14 and are apart from the second external electrode 15. The second internal electrodes 13 are connected to the second external electrode 15 and are apart from the first external electrode 14.

In such a manner, in the ceramic body 11, except for both the end surfaces facing in the X-axis direction, to which the first external electrode 14 and the second external electrode 15 are provided, surfaces of the capacitance forming unit 18 are covered with the side margins 17 and the covers 19. The side margins 17 and the covers 19 have main functions of protecting the periphery of the capacitance forming unit 18 and ensuring insulation properties of the first and second internal electrodes 12 and 13.

The first and second internal electrodes 12 and 13 are each formed of an electrically conductive material and function as internal electrodes of the multi-layer ceramic capacitor 10. Examples of the electrically conductive material include a metal material containing nickel (Ni), copper (Cu), palladium (Pd), platinum (Pt), silver (Ag), gold (Au), or an alloy of them.

A region other than the first and second internal electrodes 12 and 13 in the capacitance forming unit 18 is formed of dielectric ceramics. In the multi-layer ceramic capacitor 10, in order to increase capacitances of the ceramic layers 20 provided between the first internal electrodes 12 and the second internal electrodes 13, dielectric ceramics having a high dielectric constant is used as dielectric ceramics forming the capacitance forming unit 18.

More specifically, in the multi-layer ceramic capacitor 10, polycrystal of a barium titanate ($BaTiO_3$) based material, i.e., polycrystal having a Perovskite structure containing barium (Ba) and titanium (Ti) is used as the dielectric ceramics having a high dielectric constant that forms the capacitance forming unit 18. This provides a large capacitance to the multi-layer ceramic capacitor 10.

It should be noted that the capacitance forming unit 18 may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The side margins 17 and the covers 19 are also formed of dielectric ceramics. The material forming the side margins 17 and the covers 19 may be insulating ceramics. If dielectric ceramics having a composition system similar to that of the ceramic layers 20 of the capacitance forming unit 18 is used, internal stress in the ceramic body 11 is suppressed.

With the configuration described above, when a voltage is applied between the first external electrode 14 and the second external electrode 15 in the multi-layer ceramic capacitor 10, the voltage is applied to the plurality of ceramic layers 20 between the first internal electrodes 12 and the second internal electrodes 13. Accordingly, the multi-layer ceramic capacitor 10 stores charge corresponding to the voltage applied between the first external electrode 14 and the second external electrode 15.

It should be noted that the configuration of the multi-layer ceramic capacitor 10 according to this embodiment is not limited to the configuration shown in FIGS. 1 to 3 and can be changed as appropriate. For example, the number of first internal electrodes 12 and second internal electrodes 13 and the thickness of the ceramic layer 20 can be determined as appropriate according to the size and performance expected for the multi-layer ceramic capacitor 10.

2. Detailed Configuration of Ceramic Body 11

Figure 4:
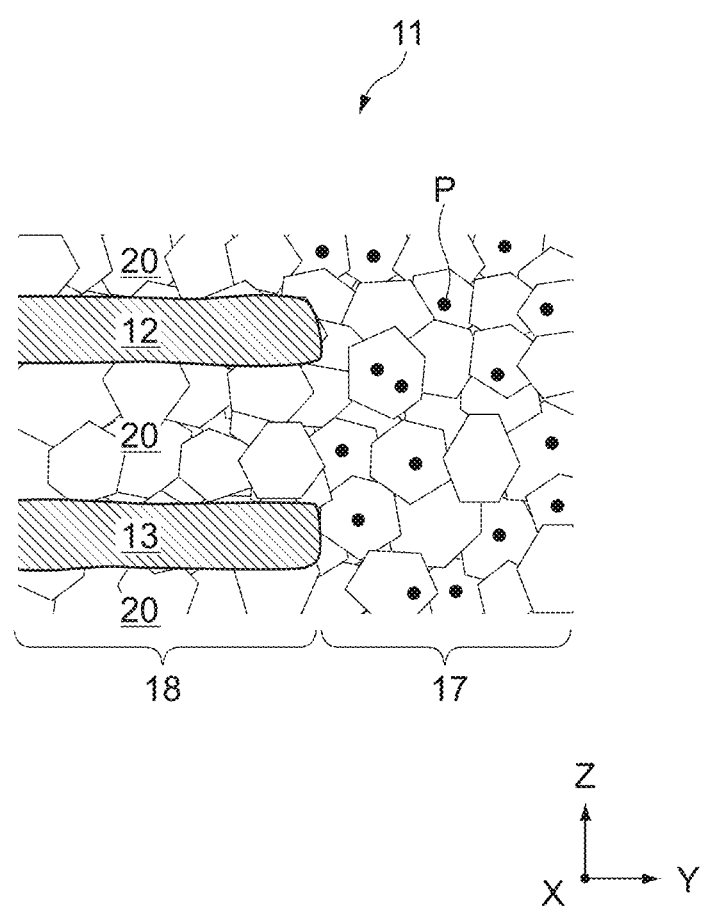
FIG. 4 is a partial cross-sectional enlarged view of FIG. 3.

FIG. 4 is a partial cross-sectional view of the ceramic body 11, showing the vicinity of the boundary between the side margin 17 and the capacitance forming unit 18 in FIG. 3 in an enlarged manner. FIG. 4 schematically shows a microstructure of the ceramic body 11. In the ceramic body 11, the side margin 17 and the ceramic layers 20 of the capacitance forming unit 18 are each formed as polycrystal.

More specifically, as shown in FIG. 4, the ceramic body 11 has a characteristic microstructure in which crystal grains including intragranular pores P exist. The intragranular pore P is formed as a minute void within the crystal grain. In other words, the intragranular pore P is distinguished from a grain boundary pore, which is generally considered as a void formed at a grain boundary between adjacent crystal grains.

The crystal grains including the intragranular pores P are not present in the entire region of the ceramic body 11. Specifically, in the ceramic body 11, the side margin 17 is formed as a first region in which the crystal grains including the intragranular pores P are dispersed, and the ceramic layers 20 of the capacitance forming unit 18 are formed as a second region in which the crystal grains including the intragranular pores P are not dispersed.

Although details will be described later, the side margin 17 is formed of a hydrothermal powder, which is a ceramic powder produced by a hydrothermal method. The hydrothermal powder has a characteristic of including, as a main component, ceramic particles including intragranular pores P within the crystal grains. Thus, in the side margin 17, many crystal grains including the intragranular pores P resulting from the hydrothermal powder are left after sintering.

The fact that the raw material is the hydrothermal powder can be confirmed by the dispersion of the crystal grains including the intragranular pores P. In other words, in the side margin 17 formed of the hydrothermal powder, the crystal grains including the intragranular pores P are dispersed in the entire side margin 17. It should be noted that all of the crystal grains do not need to include the intragranular pores P in the side margin 17.

The amount of the crystal grains including the intragranular pores P can be evaluated by an abundance rate of the intragranular pores, which is a proportion of the crystal grains including the intragranular pores P out of the crystal grains. If the raw material is the hydrothermal powder, the abundance rate of the intragranular pores is 1% or more. In other words, the abundance rate of the intragranular pores in the side margin 17 formed of the hydrothermal powder is 1% or more.

For example, the abundance rate of the intragranular pores can be obtained as a proportion of the crystal grains including the intragranular pores P out of all the crystal grains observed in a predetermined region in an image of a cross section of the side margin 17, the image being captured with a scanning electron microscope at a magnification of 5 million times. At that time, for example, a void whose size is 5 nm or more, which is observed within a crystal grain, can be set as the intragranular pore P.

In the dielectric ceramics formed of the hydrothermal powder, a high dielectric constant is difficult to obtain because of the existence of the intragranular pores P that are voids. However, in the side margin 17 that does not contribute to an electrostatic capacitance, a high dielectric constant is not required. In other words, even if the side margin 17 is formed of the hydrothermal powder, the electrostatic capacitance of the multi-layer ceramic capacitor 10 is not impaired.

Meanwhile, if the ceramic layers 20 of the capacitance forming unit 18 are formed of the hydrothermal powder, the electrostatic capacitance of the multi-layer ceramic capacitor 10 is reduced. Thus, the hydrothermal powder is not used to form the ceramic layers 20. As a result, the ceramic layers 20 become polycrystal formed of crystal grains free from intragranular pores P.

Although details will be described later, the ceramic layer 20 is formed of a ceramic powder formed by a method capable of obtaining a sufficiently large dielectric constant, such as a solid-phase method, unlike the hydrothermal method. Thus, a large electrostatic capacitance is obtained in the ceramic layer 20. It should be noted that the ceramic layer 20 may incidentally include a few crystal grains including the intragranular pores P. Specifically, the abundance rate of the intragranular pores in the ceramic layer 20 is 0.001% or less.

The intragranular pores P in the side margin 17 are each included in the crystal grain and thus less likely to be an entry pathway for moisture. Thus, even if the side margin 17 is formed of the hydrothermal powder, the moisture resistance of the multi-layer ceramic capacitor 10 is less likely to be impaired. From a similar perspective, it is favorable that the number of grain boundary pores formed at grain boundaries between the crystal grains is small in the side margin 17.

It is favorable that the side margin 17 has a grain boundary pore rate of 5% or more. The grain boundary pore rate is a proportion of the grain boundary pores (excluding intragranular pores P) in the cross section thereof. For example, the grain boundary pore rate can be calculated as a proportion of an area occupied by the grain boundary pores in a predetermined region of an image of the cross section of the side margin 17, the image being captured with a scanning electron microscope at a magnification of 5 million times.

Further, although detailed will be described later, since the hydrothermal powder has high sinterability, the side margin 17 can obtain high sinterability without including silicon as a sintering additive. This can inhibit the electrostatic capacitance from being reduced due to dispersion of silicon from the side margin 17 to the ceramic layers 20 of the capacitance forming unit 18 at the time of sintering.

It should be noted that in the ceramic body 11 the cover 19 is typically formed as the second region that is not formed of the hydrothermal powder, like the ceramic layers 20. However, the cover 19 does not contribute to the electrostatic capacitance just like the side margins 17, and thus may be formed as the first region formed of the hydrothermal powder.

3. Method of Producing Multi-layer Ceramic Capacitor 10

Figure 5:
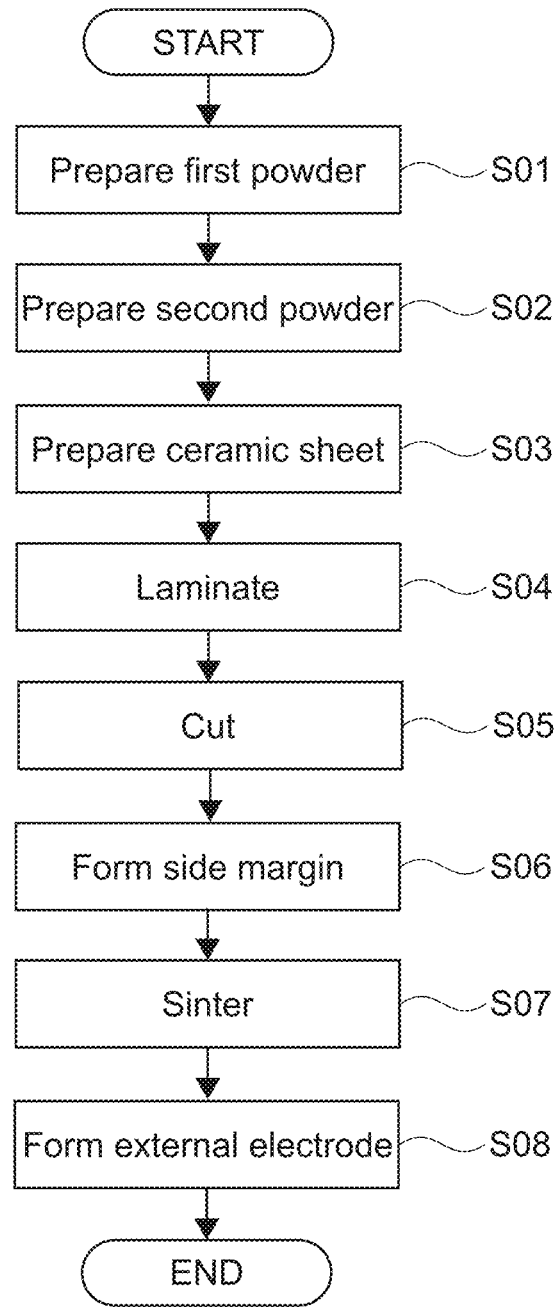
FIG. 5 is a flowchart showing a method of producing the multi-layer ceramic capacitor.
Figure 6:
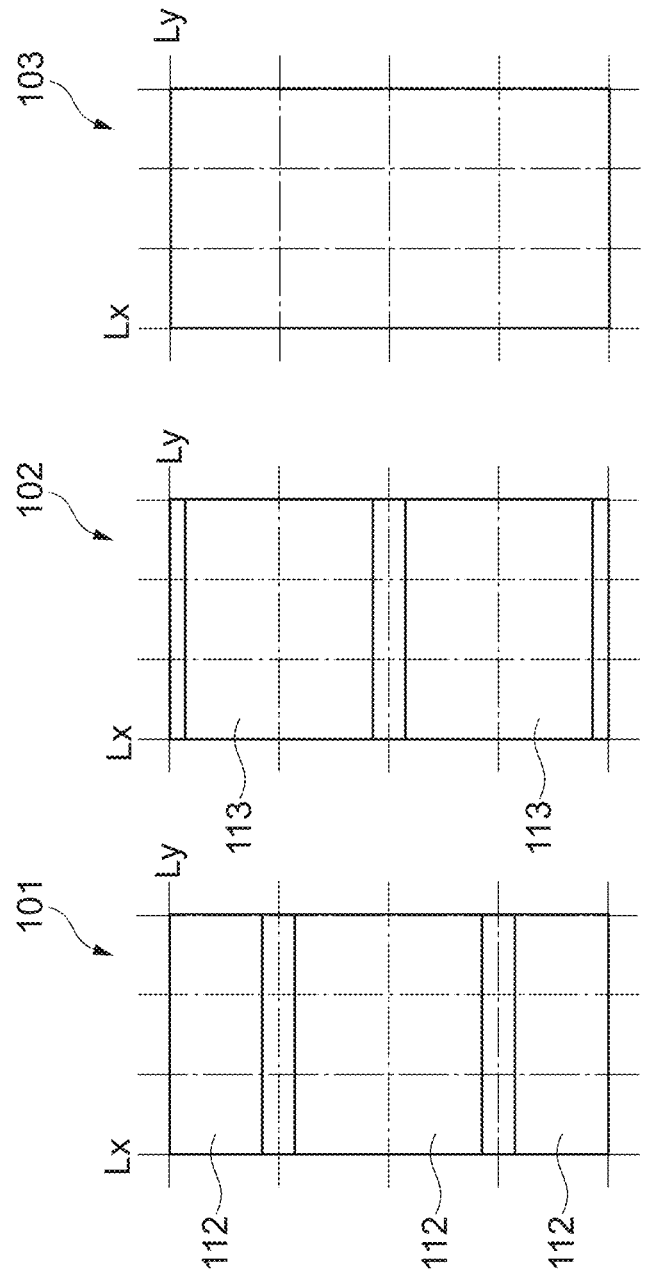
FIGS. 6A, 6B, and 6C are each a plan view showing a production process of the multi-layer ceramic capacitor.

FIG. 5 is a flowchart showing a method of producing the multi-layer ceramic capacitor 10. FIGS. 6A to 10 are views each showing a production process of the multi-layer ceramic capacitor 10. Hereinafter, the method of producing the multi-layer ceramic capacitor 10 will be described according to FIG. 5 with reference to FIGS. 6A to 10 as appropriate.

3.1 Step S01: Preparation of First Powder

In Step S01, a first powder that is a ceramic powder for forming the side margins 17 is prepared. In other words, the first powder is a hydrothermal powder produced by a hydrothermal method. For example, the hydrothermal powder of barium titanate is obtained when titanium oxide and barium hydroxide are synthesized in a pressure vessel containing hot water by a hydrothermal method.

Since the hydrothermal method allows the ceramic powder to be produced at low cost, using the hydrothermal powder to form the side margins 17 can lead to reduction in manufacturing cost of the multi-layer ceramic capacitor 10. Further, the hydrothermal powder is obtained as a fine powder formed of substantially spherical particles having a uniform particle size and, for example, has a mean particle size of 5 nm or more and 500 nm or less.

Furthermore, the hydrothermal method is likely to cause various lattice defects, that is, reduce the crystallinity of the hydrothermal powder. In this embodiment, the sinterability of the side margins 17 can be improved by purposefully using the hydrothermal powder having low crystallinity. The action of the hydrothermal powder will be described in detail in the section of Step S07 (Sintering).

The crystallinity of the Perovskite structure can be evaluated by an axis ratio c/a, which is a ratio of the length of a c-axis to the length of an a-axis in a unit lattice. In an ideal crystalline structure, the axis ratio c/a is approximately 1.01. In the hydrothermal powder, the axis ratio c/a is 1.008 or less. The axis ratio c/a can be calculated from a spectrum obtained in X-ray diffraction, for example.

3.2 Step S02: Preparation of Second Powder

In Step S02, a second powder that is a ceramic powder for forming the ceramic layers 20 is prepared. The second powder is a solid-phase powder produced by a method other than the hydrothermal method, and in this embodiment, produced by a solid-phase method. For example, the solid-phase powder of barium titanate is obtained when a mixed powder of titanium oxide and barium carbonate is heated to cause a solid-phase reaction.

3.3 Step S03: Preparation of Ceramic Sheet

In Step S03, first ceramic sheets 101 and second ceramic sheets 102 for forming the capacitance forming unit 18, third ceramic sheets 103 for forming the covers 19, and fourth ceramic sheets 117 for forming the side margins 17 are prepared.

The first, second, third, and fourth ceramic sheets 101, 102, 103, and 117 include a ceramic powder as a main component and are formed as unsintered dielectric green sheets that are formed into sheets by using a solvent and a binder. For the formation of the first, second, third, and fourth ceramic sheets 101, 102, 103, and 117, a roll coater or a doctor blade can be used, for example.

More specifically, the first, second, and third ceramic sheets 101, 102, and 103 are formed using the second powder, as a main component, which is the solid-phase powder prepared in Step S02. Meanwhile, the fourth ceramic sheets 117 forming the side margins 17 are formed using the first powder, as a main component, which is the hydrothermal powder prepared in Step S01.

As described above, the hydrothermal powder is a fine powder formed of substantially spherical particles having a uniform particle size. Thus, the hydrothermal powder is likely to be dispersed in a solvent. Further, slurry of the hydrothermal powder dispersed in the solvent and the binder is flexibly deformable and thus has high formability. Thus, high-quality fourth ceramic sheets 117 are obtained by using the hydrothermal powder.

Further, in general, high sinterability is likely to be obtained in the multi-layer unit 16 including the first and second internal electrodes 12 and 13 having a low sintering temperature, whereas high sinterability is less likely to be obtained in the side margins 17. Thus, a large amount of sintering additive is generally added to the ceramic sheets for forming the side margins 17.

In this regard, it is unnecessary to add a large amount of sintering additive to the fourth ceramic sheets 117 including as a main component the hydrothermal powder having high sinterability. In particular, it is favorable that silicon is not added to the fourth ceramic sheets 117 because silicon is likely to cause reduction in electrostatic capacitance due to the dispersion thereof to the ceramic layers 20 of the capacitance forming unit 18 at the time of sintering.

It should be noted that the third ceramic sheets 103 for forming the covers 19 may be formed of the first powder, as a main component, which is prepared in Step S01, like the fourth ceramic sheets 117. Using the inexpensive hydrothermal powder for the third ceramic sheets 103 can also lead to further reduction in manufacturing cost of the multi-layer ceramic capacitor 10.

FIGS. 6A, 6B, and 6C are plan views of the first, second, and third ceramic sheets 101, 102, and 103, respectively. At this stage, the first, second, and third ceramic sheets 101, 102, and 103 are each formed as a large-sized sheet that is not singulated. FIGS. 6A, 6B, and 6C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. A method of applying the electrically conductive paste can be optionally selected from well-known techniques. For example, for the application of the electrically conductive paste, a screen printing method or a gravure printing method can be used.

In the first and second internal electrodes 112 and 113, gaps are disposed in the X-axis direction along the cutting lines Ly for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.4 Step S04: Lamination

Figure 7:
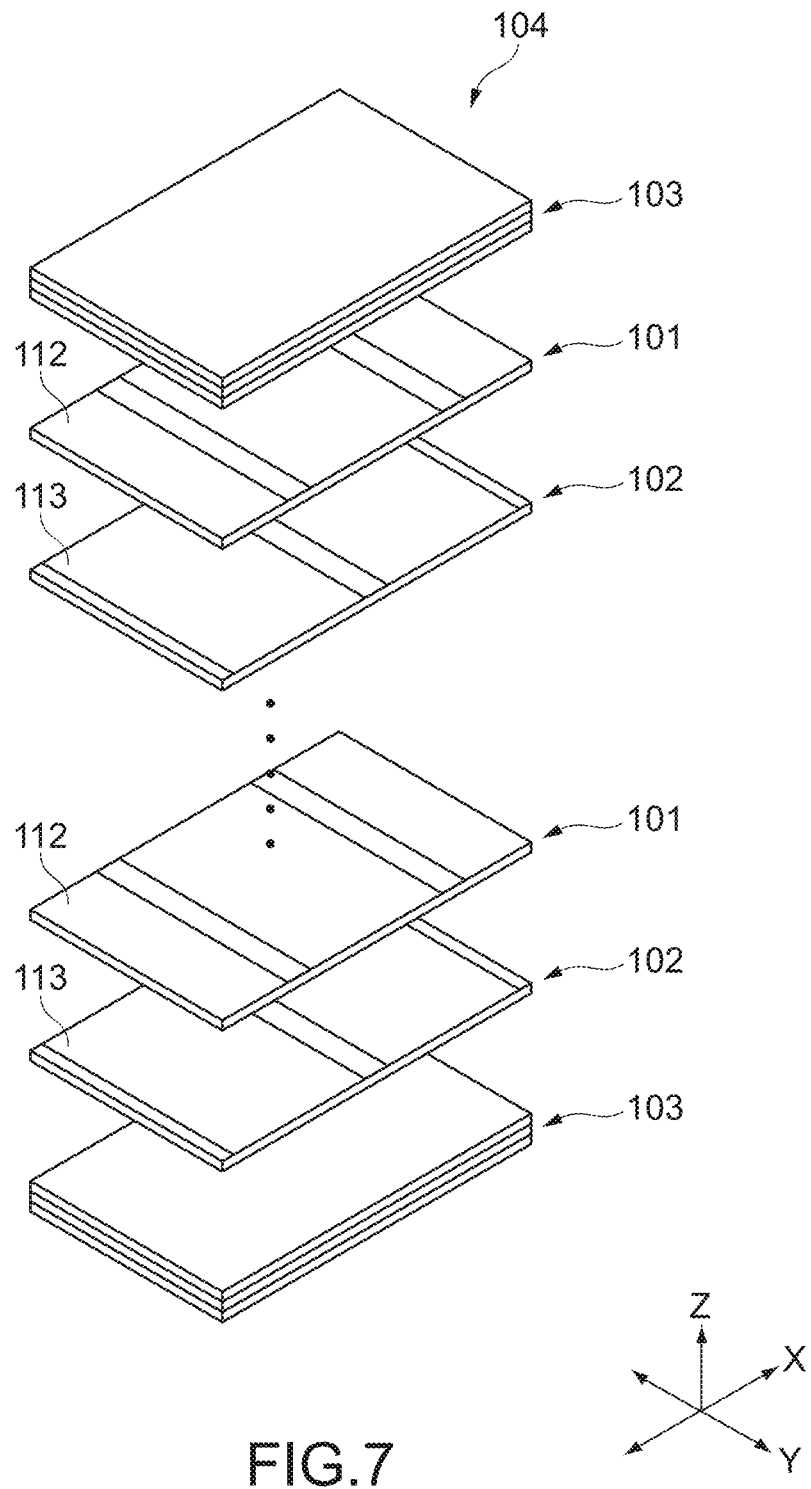
FIG. 7 is a perspective view showing the production process of the multi-layer ceramic capacitor.

In Step S04, the first, second, and third ceramic sheets 101, 102, and 103 prepared in Step S03 are laminated as shown in FIG. 7, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

3.5 Step S05: Cutting

Figure 8:
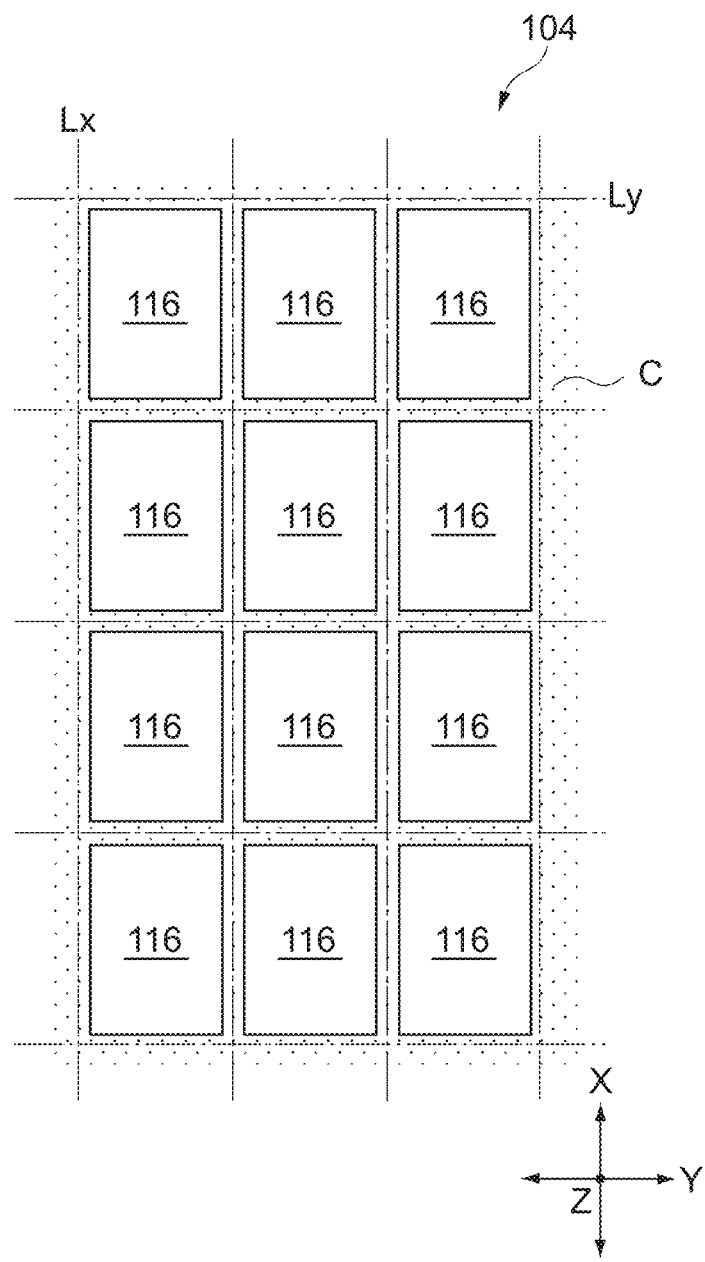
FIG. 8 is a plan view showing the production process of the multi-layer ceramic capacitor.

In Step S05, the multi-layer sheet 104 obtained in Step S04 is cut along the cutting lines Lx and Ly as shown in FIG. 8, to produce an unsintered multi-layer unit 116. The multi-layer unit 116 corresponds to the multi-layer unit 16 obtained after sintering. For cutting of the multi-layer sheet 104, for example, a rotary blade or a push-cutting blade can be used.

More specifically, the multi-layer sheet 104 is cut along the cutting lines Lx and Ly while being held by a holding member C. Thus, the multi-layer sheet 104 is singulated, and the multi-layer units 116 are obtained. At that time, the holding member C is not cut, and thus the multi-layer units 116 are connected via the holding member C.

Figure 9:
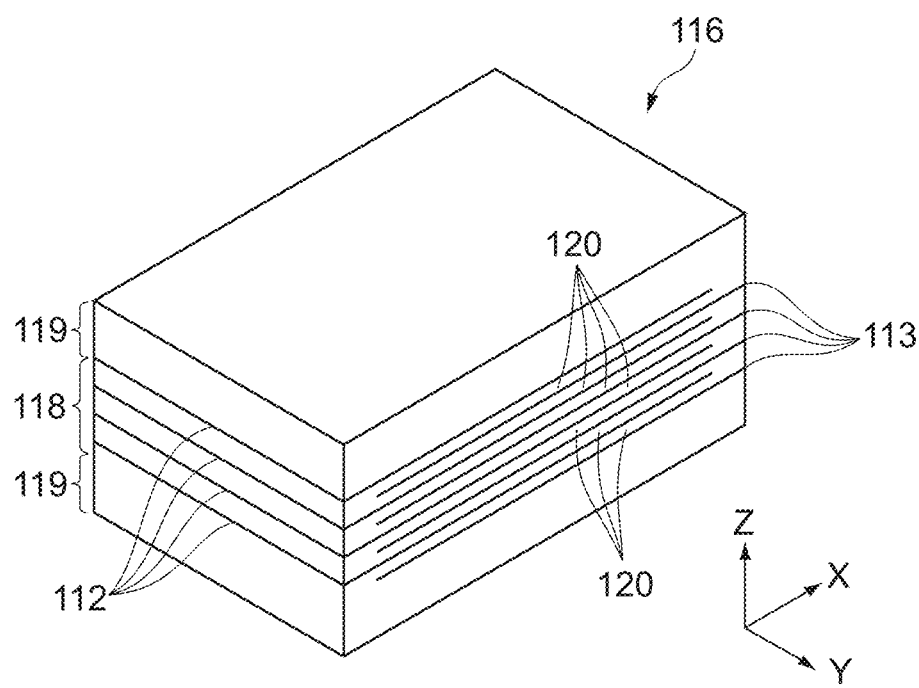
FIG. 9 is a perspective view showing the production process of the multi-layer ceramic capacitor.

FIG. 9 is a perspective view of the multi-layer unit 116 obtained in Step S05. The multi-layer unit 116 includes a capacitance forming unit 118 and covers 119. In the multi-layer unit 116, the first and second internal electrodes 112 and 113 are exposed on the cut surfaces, i.e., both the side surfaces facing in the Y-axis direction. Ceramic layers 120 are formed between the first and second internal electrodes 112 and 113.

3.6 Step S06: Formation of Side Margin

In Step S06, the fourth ceramic sheets 117 prepared in Step S03 are attached to the multi-layer unit 116 obtained in Step S05, and an unsintered ceramic body 111 is thus produced. In other words, the fourth ceramic sheets 117 are formed as unsintered side margins 17.

In Step S06, the fourth ceramic sheets 117 are attached to both the side surfaces that are the cut surfaces of the multi-layer unit 116 obtained in Step S05 and face in the Y-axis direction. Thus, in Step S06, it is favorable to detach the multi-layer unit 116 from the holding member C in advance and rotate the multi-layer unit 116 by 90 degrees.

Figure 10:
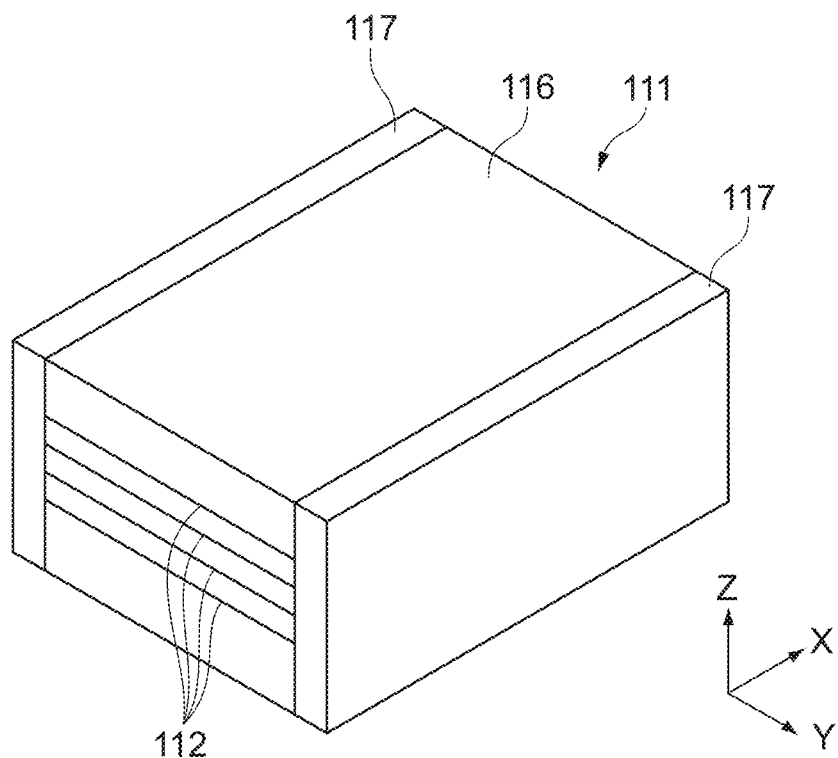
FIG. 10 is a perspective view showing the production process of the multi-layer ceramic capacitor.

FIG. 10 is a perspective view of the unsintered ceramic body 111 obtained in Step S06. In Step S06, for example, the fourth ceramic sheets 117, each of which is cut to fit the outer shape of the side surface of the multi-layer unit 116, can be attached to both the side surfaces of the multi-layer unit 116. Accordingly, the unsintered ceramic body 111 shown in FIG. 10 is obtained.

The fourth ceramic sheet 117 including as a main component the hydrothermal powder, which is a fine powder formed of particles having a uniform particle size, is flexibly deformable while following the minute irregularities of the side surface of the multi-layer unit 116, and can come into close contact with the side surface of the multi-layer unit 116 along with the side surface. Thus, in the ceramic body 111, a gap is less likely to be generated between the fourth ceramic sheet 117 and the multi-layer unit 116.

It should be noted that the method of forming the unsintered side margin 17 is not limited to the method described above. For example, the fourth ceramic sheet 117 may be cut to fit the outline of the side surface of the multi-layer unit 116 after being attached to the side surface of the multi-layer unit 116. Furthermore, the fourth ceramic sheet 117 may be punched out by the side surface of the multi-layer unit 116.

3.7 Step S07: Sintering

In Step S07, the unsintered body 111 obtained in Step S06 is sintered to produce the ceramic body 11 of the multi-layer ceramic capacitor 10 shown in FIGS. 1 to 3. In other words, in Step S07, the multi-layer unit 116 becomes the multi-layer unit 16, and the fourth ceramic sheets 117 become the side margins 17.

A sintering temperature in Step S07 can be determined on the basis of a sintering temperature for the ceramic body 111. For example, when a barium titanate based material is used as dielectric ceramics, the sintering temperature can be set to approximately 1,000 to 1,300° C. Further, sintering can be performed in a reduction atmosphere or a low-oxygen partial pressure atmosphere, for example.

In the hydrothermal powder having low crystallinity, the movement of substances is likely to occur at the time of sintering because of rearrangement of atoms forming respective ceramic particles. Further, in the hydrothermal powder including the intragranular pores P, a surface area is increased by a portion corresponding to the intragranular pores P. Accordingly, in the hydrothermal powder, a diffusion pathway for substances at the sintering is increased, and thus the movement of substances is more likely to occur.

Therefore, in the fourth ceramic sheets 117, the movement of substances in the hydrothermal powder starts at a relatively low temperature, and sintering progresses. In the fourth ceramic sheets 117, the movement of substances actively occurs in the course of sintering, and thus sintering is accelerated. Accordingly, the side margins 17 having high sinterability and a few grain boundary pores are obtained.

In such a manner, in this embodiment, the side margins 17 having high sinterability are obtained without using silicon as a sintering additive. Thus, in the multi-layer ceramic capacitor 10, reduction in electrostatic capacitance due to the dispersion of silicon from the side margins 17 to the ceramic layers 20 of the capacitance forming unit 18 can be inhibited from occurring.

Further, in the multi-layer ceramic capacitor 10, reduction in mechanical strength of the side margins 17 due to segregation of hyaline containing silicon at the grain boundaries between crystal grains forming the side margins 17 is less likely to occur. Thus, in the multi-layer ceramic capacitor 10, generation of cracks due to an external force such as thermal shock is inhibited.

Furthermore, as described above, since the multi-layer unit 116 and the fourth ceramic sheet 117 are in close contact with each other without gaps, gaps are difficult to occur between the multi-layer unit 16 and the side margin 17 in the ceramic body 11 obtained after sintering. Accordingly, higher moisture resistance is obtained in the multi-layer ceramic capacitor 10.

It should be noted that in the configuration in which silicon is not added to the fourth ceramic sheets 117, the side margins 17 containing no silicon are typically obtained. Given that a small amount of silicon contained in the capacitance forming unit 118 is dispersed to the fourth ceramic sheets 117, the content of silicon in the side margin 17 is kept equal to or less than 0.5 mol %.

3.8 Step S08: Formation of External Electrode

In Step S08, the first external electrode 14 and the second external electrode 15 are formed on the ceramic body 11 obtained in Step S07, to produce the multi-layer ceramic capacitor 10 shown in FIGS. 1 to 3. In Step S08, for example, base films, intermediate films, and surface films forming the first and second external electrodes 14 and 15 are formed on the end surfaces of the ceramic body 11 that face in the X-axis direction.

More specifically, in Step S08, first, an unsintered electrode material is applied so as to cover both the end surfaces of the ceramic body 11 that face in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S08 may be performed before Step S07. For example, before Step S07, the unsintered electrode material may be applied to both the end surfaces of the unsintered ceramic body 111 that face in the X-axis direction. Accordingly, in Step S07, sintering of the unsintered ceramic body 111 and baking of the unsintered electrode material can be simultaneously performed.

4. Examples

Hereinafter, Example of the embodiment described above will be described. The configuration of Example is merely an example of the configuration included in this embodiment. In Example, the multi-layer ceramic capacitor 10 was produced by using the production method described above. Specifically, a hydrothermal powder of barium titanate having an axis ratio c/a of 0.996 was used to form the side margins 17 without adding silicon thereto.

In contrast, a multi-layer ceramic capacitor according to Comparative example, which is different from that of this embodiment in the configuration of the side margin, was produced. In Comparative example, a solid-phase powder of barium titanate having an axis ratio c/a of 1.01 was used to form the side margins 17 by adding 1 mol % of silicon thereto. In Example and Comparative example, the configurations thereof are similar to each other except for the raw material of the side margin.

An electrostatic capacitance measurement, a heat resistance test, and a moisture resistance test were performed for samples according to Example and Comparative example. In the heat resistance test, the samples according to Example and Comparative example were heated to a temperature of 350° C. in a reflow oven. In the moisture resistance test, the samples according to Example and Comparative example were held for 1,000 hours at a temperature of 45° C. and a humidity of 95% under application of a rated voltage of 10 V.

The heat resistance test and the moisture resistance test were performed on 1000 samples according to each of Example and Comparative example. In the heat resistance test, samples in which cracks were generated were determined as defectives in heat resistance. In the moisture resistance test, samples whose electric resistance value was smaller than 10 MSΩ were determined as defectives in moisture resistance. Table 1 shows results of those evaluations.

TABLE 1

|  | Electrostatic capacitance | Number of defectives in heat resistance | Number of defectives in moisture resistance |
|---|---|---|---|
| Example | 22.1 μF | 0/1000 | 0/1000 |
| Comparative example | 20.3 μF | 3/1000 | 5/1000 |

As shown in Table 1, in the samples according to Example, a larger electrostatic capacitance was obtained than that in the samples according to Comparative example. Since silicon is added to the side margin in the samples according to Comparative example, it is considered that the electrostatic capacitance is reduced due to the dispersion of silicon from the side margin to the ceramic layer at the time of sintering.

Further, the defectives in heat resistance were not generated in the samples according to Example, whereas the defectives in heat resistance were generated in the samples according to Comparative example. In the samples according to Comparative example, it is considered that cracks are likely to be generated due to thermal shock because of segregation of hyaline containing silicon at grain boundaries between crystal grains in the side margin.

Furthermore, the defectives in moisture resistance were not generated in the samples according to Example, whereas the defectives in moisture resistance were generated in the samples according to Comparative example. In the samples according to Comparative example, it is considered that the moisture resistance is impaired by a gap generated between the side margin and the multi-layer unit, the influence of a grain boundary pore of the side margin, or the like.

II Second Embodiment

Figure 11:
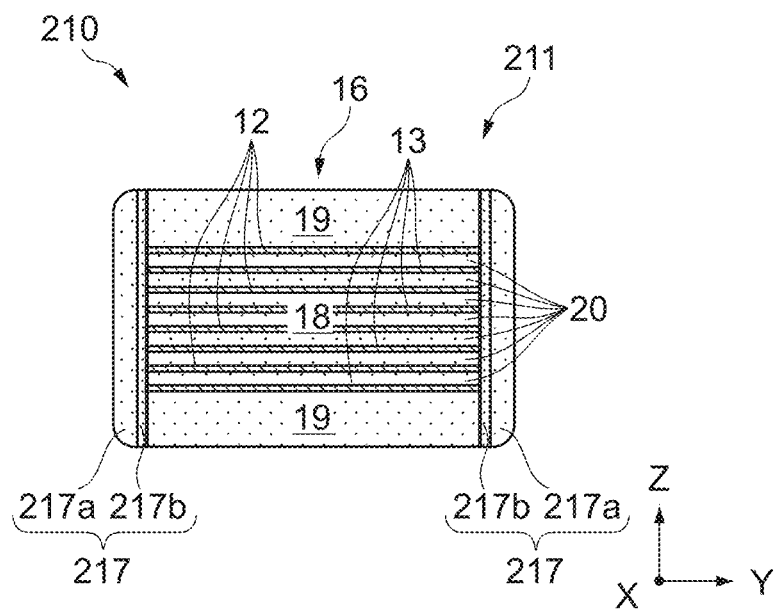
FIG. 11 is a cross-sectional view of a multi-layer ceramic capacitor according to a second embodiment of the present disclosure.

FIG. 11 is a cross-sectional view of a multi-layer ceramic capacitor 210 according to a second embodiment of the present disclosure. The multi-layer ceramic capacitor 210 includes side margins 217. In the multi-layer ceramic capacitor 210, the configuration of the side margin 217 is different from that of the first embodiment, and the other configurations are common to those of the first embodiment.

The side margin 217 has a multi-layer structure in a thickness direction (Y-axis direction) and includes an external layer 217a and a connection layer 217b. The external layer 217a is disposed on the outer side in the Y-axis direction and forms the side surface of a ceramic body 211. The connection layer 217b is disposed between the multi-layer unit 16 and the external layer 217a and connects the external layer 217a to the side surface of the multi-layer unit 16.

Figure 12:
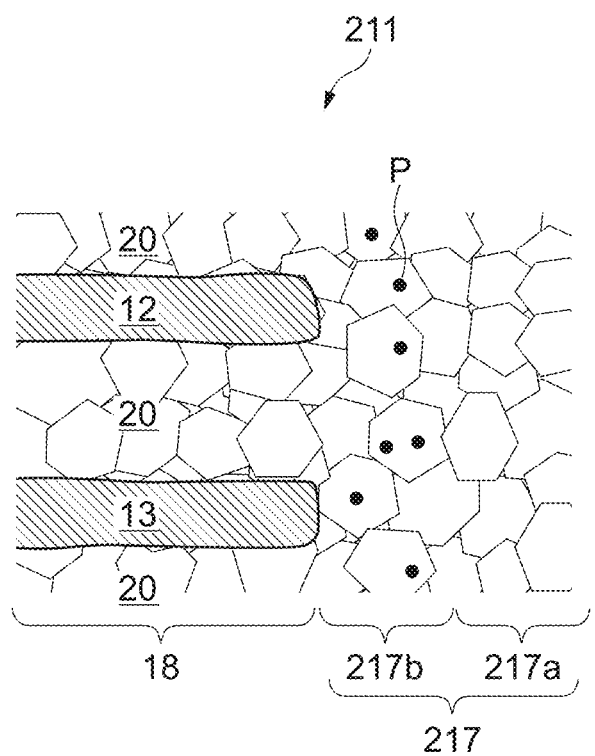
FIG. 12 is a partial cross-sectional enlarged view of FIG. 11.

FIG. 12 is a partial cross-sectional view of the ceramic body 211, showing the vicinity of the boundary between the side margin 217 and the capacitance forming unit 18 in FIG. 11 in an enlarged manner. In the side margin 217, the connection layer 217b is formed as a first region formed of the hydrothermal powder, and the external layer 217a is formed as a second region that is not formed of the hydrothermal powder.

Therefore, in the side margin 217, the crystal grains including the intragranular pores P are dispersed in the connection layer 217b, and the crystal grains including the intragranular pores P are not dispersed in the external layer 217a. It should be noted that, in the side margin 217, the connection layer 217b only needs to be disposed in a region adjacent to the multi-layer unit 16, and a layer other than the external layer 217a and the connection layer 217b may be included.

Figure 13:
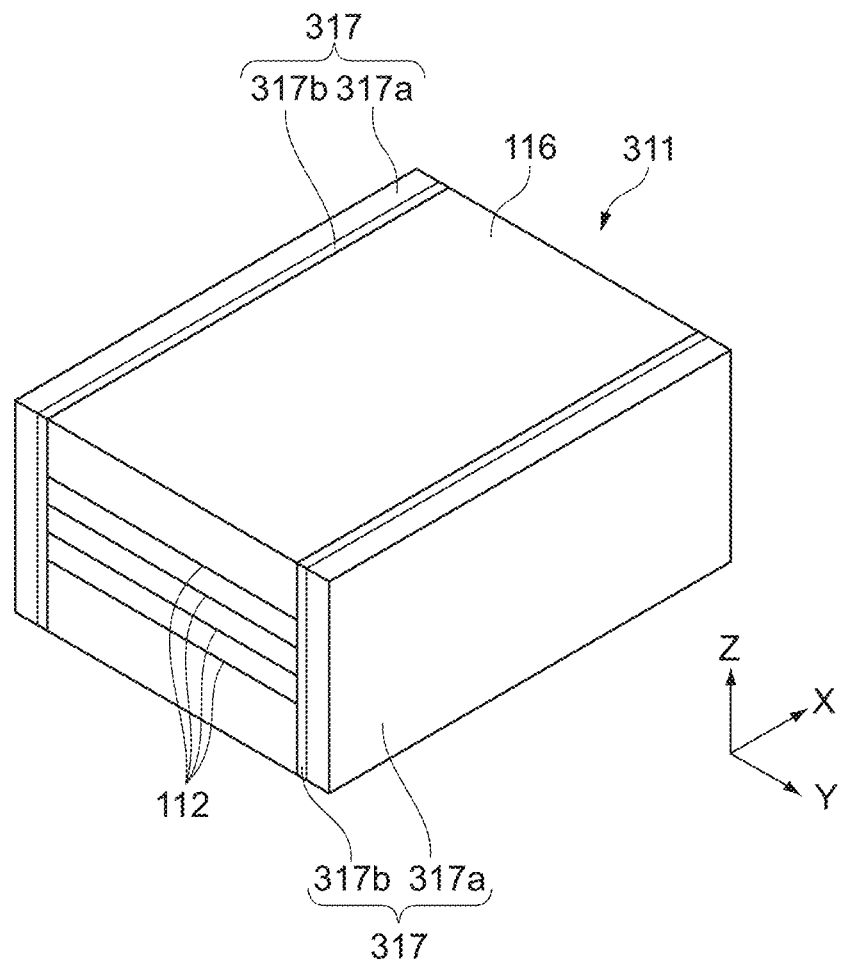
FIG. 13 is a schematic view showing a production process of the multi-layer ceramic capacitor.

The ceramic body 211 having the configuration descried above is obtained by sintering an unsintered ceramic body 311 shown in FIG. 13. In the ceramic body 311, a fifth ceramic sheet 317a forming the external layer 217a is disposed on each side surface of the multi-layer unit 116 via a sixth ceramic sheet 317b forming the connection layer 217b.

The fifth ceramic sheet 317a forming the external layer 217a is formed using the second powder, as a main component, which is the solid-phase powder. The sixth ceramic sheet 317b forming the connection layer 217b is formed using the first powder, as a main component, which is the hydrothermal powder. Subsequently, the fifth ceramic sheet 317a and the sixth ceramic sheet 317b are attached to the side surface of the multi-layer unit 116.

The sixth ceramic sheet 317b including the hydrothermal powder, as a main component, which is a fine powder formed of particles having a uniform particle size, is flexibly deformable while following the shapes of the side surface of the multi-layer unit 116 and the fifth ceramic sheet 317a. Accordingly, the sixth ceramic sheet 317b can come into close contact with both of the multi-layer unit 116 and the fifth ceramic sheet 317a.

Thus, in the ceramic body 211 obtained by sintering the ceramic body 311, a gap is less likely to be generated between the multi-layer unit 116 and the side margin 217. Further, in the connection layer 217b of the side margin 217 formed by the hydrothermal method, high sinterability is obtained. Therefore, in the multi-layer ceramic capacitor 210, high moisture resistance is obtained.

It should be noted that in the side margin 217 of the multi-layer ceramic capacitor 210, the external layer 217a may also be formed as the first region formed of the hydrothermal powder as in the case of the connection layer 217b. In this case, the fifth ceramic sheet 317a forming the external layer 217a can be formed using the first powder, which is the hydrothermal powder, as a main component.

III Other Embodiments

While the embodiments of the present disclosure have been described hereinabove, the present disclosure is not limited to the embodiments described above, and it should be appreciated that the present disclosure may be variously modified.

For example, in the multi-layer ceramic capacitor, the capacitance forming unit may be divided into capacitance forming units in the Z-axis direction. In this case, in each capacitance forming unit, the first internal electrodes and the second internal electrodes only need to be alternately disposed along the Z-axis direction. In a portion where the capacitance forming units are next to each other, the first internal electrodes or the second internal electrodes may be continuously disposed.

Further, the method of forming the side margin is not limited to the method of using the ceramic sheet. For example, a dip method of immersing the side surfaces of the multi-layer unit into ceramic slurry including as a main component the hydrothermal powder may be used. Even in the side margin formed by such a method, high sinterability is obtained as in the case of the method described above.

What is claimed is:

1. A multi-layer ceramic capacitor, comprising:
a first region in which crystal grains including intragranular pores are dispersed;
a second region in which crystal grains including intragranular pores are not dispersed;
a multi-layer unit including
a capacitance forming unit including
ceramic layers that are laminated in a first direction and include the second region, and
internal electrodes disposed between the ceramic layers; and
a cover that covers the capacitance forming unit from the first direction and includes a region, the region being adjacent to the capacitance forming unit and including the first region over the entire cover, and
a side margin that covers the multi-layer unit from a second direction orthogonal to the first direction,
wherein an abundance rate of the intragranular pores is a proportion of a number of the crystal grains including the intragranular pores to a total number of crystal grains,
wherein the abundance rate of the intragranular pores in the first region is 1% or more,
wherein the abundance rate of the intragranular pores in the second region is 0.001% or less
wherein an entirety of the ceramic layers is in the second region, and
wherein at least a part of the side margin is the first region that has intragranular pores dispersed therein.

2. The multi-layer ceramic capacitor according to claim 1, wherein
the first region includes silicon of 0.5 mol % or less.

3. The multi-layer ceramic capacitor according to claim 1, wherein
the cover has a grain boundary pore rate of 5% or less.

4. The multi-layer ceramic capacitor according to claim 1, wherein
each of the first region and the second region includes polycrystal having a perovskite structure including barium and titanium.

5. The multi-layer ceramic capacitor according to claim 1, wherein the entire side margin is the first region.

6. The multi-layer ceramic capacitor according to claim 1, wherein a part of the side margin on a side of the capacitance forming unit is the first region.

* * * * *